(12) United States Patent  
Park

(10) Patent No.: US 6,466,535 B2
(45) Date of Patent: Oct. 15, 2002

(54) METHOD AND APPARATUS FOR RECORDING AND REPRODUCING DATA ON AND FROM AN OPTICAL DISK

(75) Inventor: In-Sik Park, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/178,497

(22) Filed: Oct. 26, 1998

(65) Prior Publication Data

US 2002/0067671 A1 Jun. 6, 2002

(30) Foreign Application Priority Data

Nov. 1, 1997 (KR) .............................. 97-57556

(51) Int. Cl.$^7$ ................................. G11B 7/00
(52) U.S. Cl. ............................ 369/112.01; 369/124.03; 369/122
(58) Field of Search ................ 369/121, 122, 369/112, 100, 94, 112.01, 124.03

(56) References Cited

U.S. PATENT DOCUMENTS

| | | | | |
|---|---|---|---|---|
| 4,074,085 A | * | 2/1978 | Russell | 369/95 |
| 4,612,271 A | * | 9/1986 | Makino et al. | 430/72 |
| 4,703,469 A | * | 10/1987 | Pettigrew et al. | 369/108 |
| 4,908,813 A | * | 3/1990 | Ojima et al. | 369/94 |
| 4,922,454 A | * | 5/1990 | Taki | 365/122 |
| 5,093,822 A | * | 3/1992 | Kugiya et al. | 369/121 |
| 5,226,029 A | * | 7/1993 | Takanashi et al. | 369/100 |
| 5,251,198 A | * | 10/1993 | Strickler | 369/110 |
| 5,272,667 A | * | 12/1993 | Yamada et al. | 365/113 |
| 5,315,573 A | * | 5/1994 | Nakao et al. | 369/100 |
| 5,410,531 A | * | 4/1995 | Tsujioka | 369/110 |
| 5,438,561 A | * | 8/1995 | Van et al. | 369/108 |
| 5,485,452 A | * | 1/1996 | Maeda | 369/284 |
| 5,513,164 A | * | 4/1996 | Tanaka et al. | 369/112 |
| 5,672,462 A | * | 9/1997 | Takuma et al. | 430/270.15 |
| 5,766,717 A | * | 6/1998 | Kaneko et al. | 369/283 X |
| 5,859,822 A | * | 1/1999 | Inoue et al. | 369/58 |
| 5,886,969 A | * | 3/1999 | Maeda et al. | 369/100 |
| 5,905,708 A | * | 5/1999 | Richter | 369/112 |
| 6,061,324 A | * | 5/2000 | Arai et al. | 369/112 |

FOREIGN PATENT DOCUMENTS

| | | | | |
|---|---|---|---|---|
| JP | 61-175942 | * | 8/1986 | 369/112.16 |
| JP | 3-086976 | * | 4/1991 | |
| JP | 6-325405 | * | 11/1994 | |
| JP | 10-154346 | * | 6/1998 | |

OTHER PUBLICATIONS

English translation of JP 61–175942.*

* cited by examiner

*Primary Examiner*—Aristotelis M. Psitos
(74) *Attorney, Agent, or Firm*—Staas & Halsey LLP

(57) ABSTRACT

A method and apparatus for recording and reproducing data on and from an optical disk. The recording/reproducing apparatus records the data on an optical disk exhibiting a difference in an optical absorption rate between wavelengths using a light beam having a wavelength of a first standard. The data recorded on the optical disk is reproduced using a light beam having a wavelength of a second standard.

34 Claims, 4 Drawing Sheets

METHOD AND APPARATUS FOR RECORDING AND REPRODUCING DATA ON AND FROM AN OPTICAL DISK

CROSS REFERENCE TO RELATED APPLICATION

This application claims the benefit of Korean Application No. 57556/1997, filed Nov. 1, 1997, in the Korean Patent Office, the disclosure of which is incorporated herein by reference.

BACKGROUND OF THE INVENTION

1. Field of the Invention

The present invention relates to a method and apparatus for recording and reproducing data on and from an optical information recording medium, and in particular, to a method and apparatus for recording and reproducing data by irradiating a light beam to an optical disk having a wavelength characteristic curve relationship (response to light beams of different wavelengths).

2. Description of the Related Art

An optical disk, which is one of different types of optical information recording media, has widely been used to record and reproduce various information including audio and video data. According to the number of times information is recorded on the optical disk, the optical disk is classified as a read-only type disk, a recordable or write-once type disk, a rewritable or overwritable type disk, etc. The read-only type disk cannot write data but can read data. Examples of the read-only type disk are a digital audio compact disk (CDDA), a read only memory compact disk (CD-ROM), and a digital video disk (DVD)-video, which are commercially available. As examples of the recordable or write-once type disk which can write data only once, there are a recordable compact disk (CD-R) which is commercially available and a recordable digital video disk (DVD-R) which is expected to come onto the market. The rewritable or overwritable type disk can write data several times using an magneto-optical or phase-change method. As examples of such a type of optical disk, a rewritable compact disk (CD-RW) and a power disk (PD) are commercially available, and a random access memory compact disk (DVD-RAM) is expected to come onto the market.

Data is recorded and reproduced on and from the optical disk by irradiating a light beam. A laser beam is used as light, and a semiconductor laser such as a laser diode is used as a light source for generating the laser beam. To record data on the optical disk, an optical output of the light source should be approximately several tens of mW, in consideration of the optical efficiency of an optical pickup. The higher the optical output is, the faster a recording speed is. However, the light source having the optical output higher than such several tens of mW is expensive and generates heat due to a loss of light. Therefore, there is an upper limit of the output of the light source in use.

The CD-R and CD-RW of a CD series are standardized to use the light source having a wavelength of 780 nm, which is an infrared wavelength band. Meanwhile, the DVD-ROM, DVD-R and DVD-RAM of a DVD series are standardized to use the light source having a wavelength of 635–650 nm, which is a red wavelength band. Among theses disks, the CD-R and DVD-R have a wavelength characteristic curve relationship (response). This means that the CD-R and DVD-R have particular reflectance-absorption values based upon the wavelengths of the light beams irradiated thereon. Since the material of a recording layer of the CD-R or DVD-R contains a coloring matter, the absorption rate differs according to the waveform band and the reflectance of the disk varies. The characteristic of the reflectance as a function of the wavelength of the CD-R is illustrated in FIG. 1. As shown in FIG. 1, the recording layer of the CD-R is formed such that the reflectance at the wavelength of 780 nm is 70% or more, and the reflectance at the wavelength of 650 nm is 10% or less.

In the CD standard, since the rotating speed of the disk during recording and reproducing is low (about 1.2 m/s), it takes a long time to record and reproduce a large amount of data. This speed problem can be overcome by rotating the disk at high speed during recording. Thus, in a CD-R drive, the speed problem has been solved by rotating the disk at high speed, and the CD-R drive which can record and reproduce 2 or 4 times a reference speed of the CD has been announced. However, as the recording speed increases, the optical output needed to record data, that is, a recording optical power, increases as shown in FIG. 2, although it varies according to the sensitivity of the recording layer of the disk. The CD-R drive which can record and reproduce data on and from the CD-R uses a high output semiconductor laser having the wavelength of 780 nm. When recording data, the CD-R drive uses the semiconductor laser to produce a high output, and when reproducing data, it uses the semiconductor laser to generate a low output. As noted above, since the optical output needed to record data increases as the recording speed becomes faster, a high output semiconductor laser is required for high speed recording as opposed to the type of semiconductor laser required for low speed recording. However, since the high output semiconductor laser raises the cost of the drive and generates heat, its performance may be degraded.

As described previously, since the optical disk such as the CD-R having the wavelength characteristic curve relationship is used to record and reproduce data at the wavelength of 780 nm of a high reflectance, there is no problem in recording and reproducing data in the CD-R drive using the wavelength of 780 nm. However, if the recording optical power increases by speeding up the rotating speed in order to shorten the recording time, there are problems such as the generation of heat and a rise in cost. That is, in the CD-R driver using a single wavelength of 780 mn, there is a limit to the improvement of the recording speed.

SUMMARY OF THE INVENTION

It is an object of the present invention to provide a recording/reproducing method and apparatus which can efficiently improve a recording speed for an optical disk having a wavelength characteristic curve relationship.

It is another object of the present invention to provide a recording/reproducing method and apparatus which can improve a recording speed for an optical disk having a wavelength characteristic curve relationship which generates less heat and without raising the cost thereof.

It is still another object of the present invention to provide a recording/reproducing method and apparatus which can record and reproduce data in a CD-R at high speed and also can be applied to a drive using a rewritable optical disk of a DVD series. The present invention can also be applied to a drive for recording and reproducing optical disks having the same wavelength characteristic as the CD-R, and to the DVD-R, CD-RW, DD and DVD-RAM.

Additional objects and advantages of the invention will be set forth in part in the description which follows and, in part, will be obvious from the description, or may be learned by practice of the invention.

The foregoing objects and advantages of the present invention are achieved by providing an apparatus which enables data to be recorded on an optical disk exhibiting a difference in an optical absorption rate between wavelengths using a light beam having a wavelength of a first standard. The data recorded on the optical disk is reproduced by a light beam having a wavelength of a second standard. Preferably, the wavelength of the first standard is shorter than the wavelength of the second standard. For example, the wavelength of the first standard is 650 nm and the wavelength of the second standard is 780 nm.

The above and other objects of the present invention may also be achieved by an apparatus for recording and reproducing data on and from an optical disk exhibiting a difference in an optical absorption rate between wavelengths and which includes a first light source to generate light having a wavelength of a first standard of a high absorption rate in the optical disk; a second light source to generate light having a wavelength of a second standard of a low absorption rate in the optical disk; an optical system to convert the lights generated from the first and second light sources into beams to be irradiated to the optical disk and condensing light reflected from the optical disk; an optical detector to detect reflected light condensed by the optical system and to convert the detected light into an electric signal; a recording processor to drive the first light source by recording data according to the second standard, and to drive the second light source when reproducing data from the optical disk; a reproducing processor to reproduce data by the electric signal generated from the optical detector according to the second standard; and a controller to record data on the optical disk by driving the first light source by the recording processor, and to reproduce data from the optical disk by driving the second light source by the recording processor.

The above and other objects of the present invention are further achieved by a method of recording and reproducing data by irradiating a light beam to at least one of a first optical disk of one kind exhibiting a difference in an optical absorption rate between wavelengths and a second optical disk of another kind, and which includes the steps of recording data on the first optical disk by a light beam having a wavelength of a first standard of a high absorption rate in the first optical disk, and reproducing the data recorded on the first optical disk by a light beam having a wavelength of a second standard of a low absorption rate in the first optical disk; and recording data on the second optical disk by the light beam having a wavelength of the first standard, and reproducing the data recorded on the second optical disk by the light beam having a wavelength of the first standard. The first optical disk may be a CD-R and the second optical disk may be a rewritable disk of a DVD series.

The above and other objects of the present invention are still further achieved by an apparatus for recording and reproducing data by irradiating a light beam to at least one of a first optical disk of one kind exhibiting a difference in an optical absorption rate between wavelengths and a second optical disk of another kind, and which includes a first light source to generate light having a wavelength of a first standard of a high absorption rate in the first optical disk; a second light source to generate light having a wavelength of a second standard of a low absorption rate in the first optical disk; an optical system to convert the lights generated from the first and second light sources into beams to be irradiated to a currently mounted optical disk out of the first and second optical disks and condensing light reflected from the currently mounted optical disk; an optical detector to detect reflected light condensed by the optical system and converting the detected light into an electric signal; a first recording processor to drive the first light source by recording data according to the second standard, to drive the second light source when reproducing data from the first optical disk; a second recording processor to drive the first light source by recording data according to the first standard, to drive the first light source when reproducing data from the second optical disk; a first reproducing processor to reproduce data by the electric signal generated from the optical detector according to the second standard; a second reproducing processor to reproduce data by the electric signal generated from the optical detector according to the first standard; and a controller to record data on the first optical disk by driving the first light source by the first recording processor, and to reproduce data from the first optical disk by driving the second light source using the first recording processor and simultaneously operating the first reproducing processor, and to record data on the second optical disk by driving the first light source by the second recording processor, and to reproduce data from the second optical disk by driving the first light source using the second recording processor and simultaneously operating the second reproducing processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

In the following description, numerous specific details, such as kinds of an optical disk, wavelengths, etc., are set forth to provide a more thorough understanding of the present invention. It will be apparent, however, to one skilled in the art that the present invention may be practiced without these specific details. In other instances, well known functions and constructions have not been described so as not to obscure the present invention.

Figure 1:
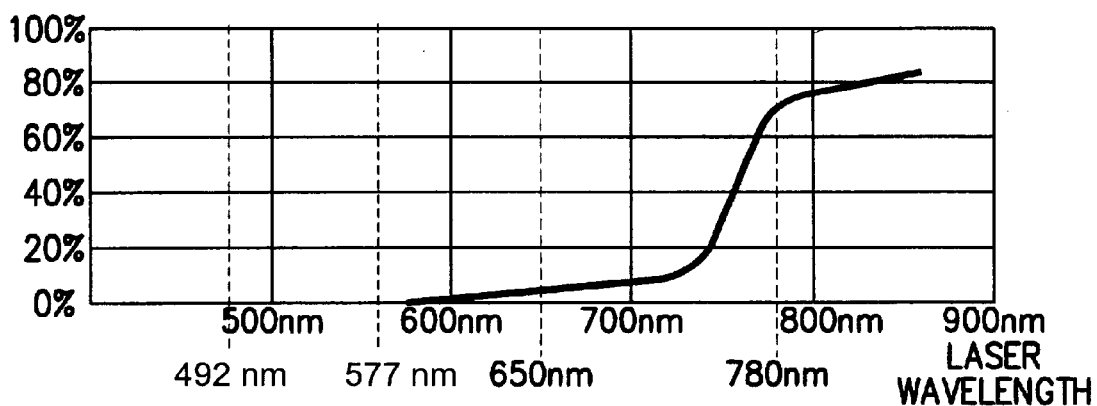
FIG. 1 is a graph showing the characteristic of an optical reflectance of a general CD-R.
Figure 2:
FIG. 2 is a graph showing recording optical power as a function of recording linear velocity when recording data in a general optical disk.

In general, if a laser of a red wavelength, 650 nm for example, which is a reference wavelength of the DVD standard is irradiated on the CD-R, the reflectance is lowered to 10% or less, as shown in FIG. 1. Hence, the absorption rate is high and the quantity of light returned from the disk is reduced. If the quantity of reflected light decreases, a signal level is reduced, thus causing a problem in reproducing data from the CD-R. That is, in a DVD system using light of the red wavelength, the reflectance is very low, so that it is difficult to reproduce data from the CD-R. In order to reproduce data from the CD-R, it is essential to use the light source of an infrared wavelength of 780 nm. A DVD-ROM drive utilizes an optical pickup using two wavelengths of 650 nm and 780 nm. When reproducing data from the CD-R, the wavelength of 780 nm is used, and when reproducing data from the DVD, the wavelength of 650 nm is used, thereby reproducing data from the CD-R as well as the DVD. A preferred embodiment of the present invention is applied to an example for reproducing data from the optical disk of a CD series, recording data on the CD-R, and recording and reproducing data on and from a rewritable optical disk of a DVD series.

Figure 3:
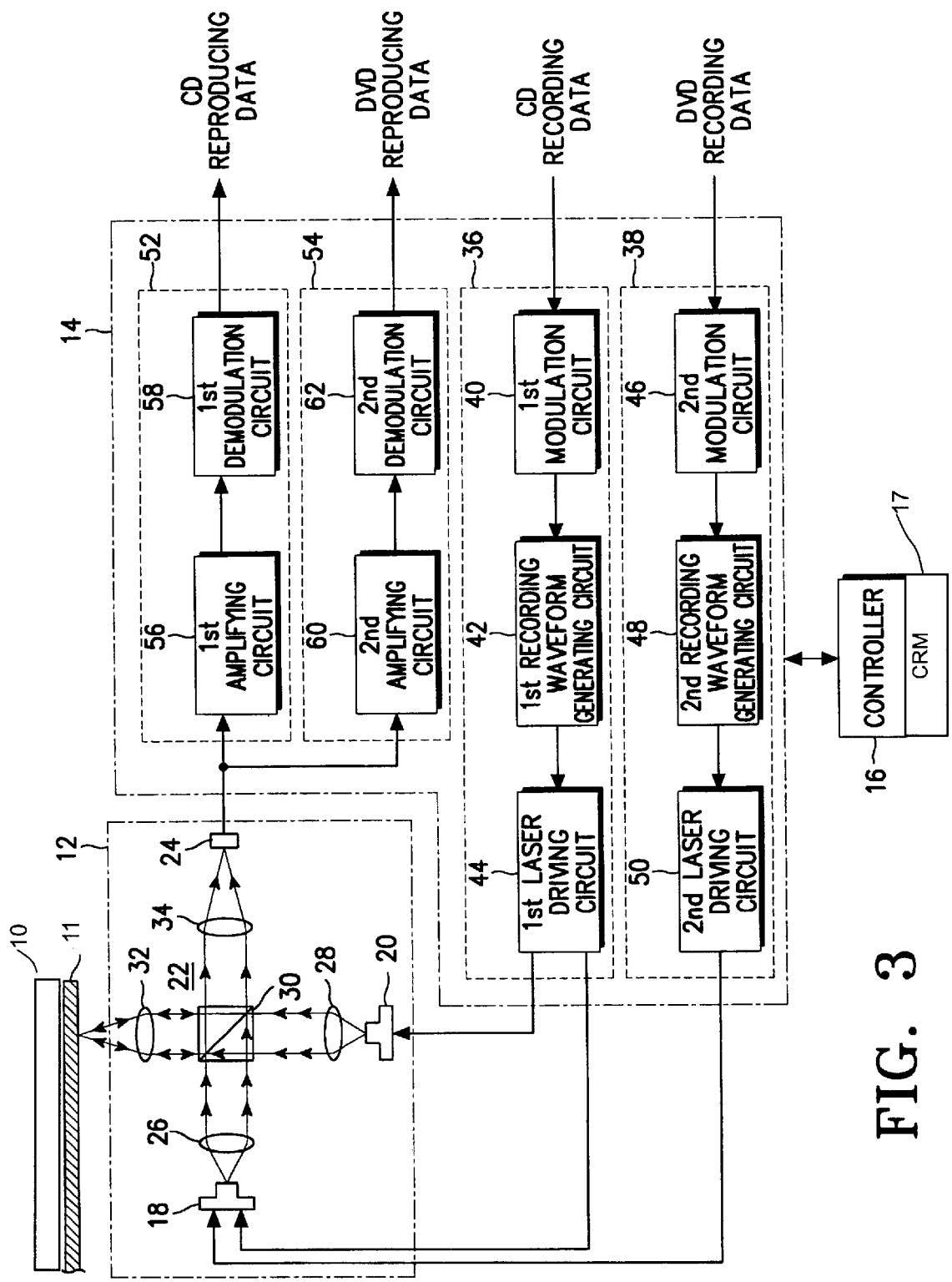
FIG. 3 is a block diagram of an optical disk data recording and reproducing apparatus according to an embodiment of the present invention.

An optical disk data recording and reproducing apparatus of FIG. 3 shows the construction in which it is possible to reproduce data from the optical disk of the CD series, record data on the CD-R, and record and reproduce data on and from the rewritable optical disk of the DVD series. In the following description, the rewritable optical disk of the DVD series is called a DVD-RW. A first standard is used to designate the DVD standard and a second standard is used to represent the CD standard. In this case, the wavelength of the first standard is 635–650 nm, which is a red wavelength band, typically, 650 nm. The wavelength of the second standard is 780 nm.

An optical disk drive basically includes an optical pickup, a circuit part and a mechanical part. In FIG. 3, the mechanical part which is not directly related to the present invention is not shown. In the circuit part, other portions including portions related to a servo are not shown and only a recording/reproducing signal processor 14 and a controller are illustrated An optical pickup 12 records or reproduces a signal provided from the recording/reproducing signal processor 14 on an optical disk 10 and supplies the recorded or reproduced signal to the recording/reproducing signal processor 14. The recording/reproducing signal processor 14 generates a signal to be recorded through the optical pickup 12 or processes a signal reproduced by the optical pickup 12.

The optical pickup 12 includes two light sources, that is, first and second light sources 18 and 20, and one optical system 22. One optical detector 24 is contained in the optical pickup 12. The first and second light sources 18 and 20 use a semiconductor laser, respectively, and produce light beams of different wavelengths. In the embodiment of the present invention, the first light source 18 uses the semiconductor laser oscillating a laser of 650 nm of a red wavelength of a high absorption rate, that is, a low reflectance in the CD-R. The second light source 20 uses the semiconductor laser oscillating a laser of 780 nm of an infrared wavelength of a low absorption rate, that is, a high reflectance in the CD-R. The first light source 18 is a high output light source of about 40 mW which is a rewritable output. The second light source 20 is a low output light source of about 5 mW which can not record data, but reproduces data from the optical disk 10.

The optical system 22 converts lights generated from the first and second light sources 18 and 20 into beams and irradiates the beams to the optical disk 10. The optical system 22 also condenses light reflected from the optical disk 10 and supplies the condensed light to the optical detector 24. The optical disk 10 is mounted in an optical disk drive including the recording/reproducing apparatus of FIG. 3, and it may be one of the optical disks of the CD series including the CD-R, or one of the optical disks of the DVD series including the DVD-RW. In this optical system 22, the light generated from the first light source 18 is converted into a parallel beam by a collimator lens 26 which is suitably designed for the wavelength of 650 nm, and irradiated onto the optical disk 10 via a beam splitter 30 and an object lens 32. The light generated from the second light source 20 is converted into a parallel beam by a collimator lens 28 which is suitably designed for the wavelength of 780 nm, and irradiated to a data recording surface of the optical disk 10 via the beam splitter 30 and the object lens 32. The light beam irradiated to the optical disk 10 is reflected with a difference in the reflection between a recording portion and a non-recording portion of the data recording surface of the optical disk 10. Thus, the light reflected from the optical disk is applied to the optical detector 24 through the object lens 32, the beam splitter 30 and a condenser lens 34.

The optical detector 24 detects the light condensed by the condenser lens 34 and converts the detected light into an electric signal. A photo diode which is a photoelectric conversion element, is used as the optical detector.

In FIG. 3, although the optical pickup 12 has one optical detector 24 and one optical system 32, it may use two optical detectors and two optical systems for use with the CD standard and the DVD standard. Thus, one or two optical detectors and optical systems may be used, like a typical optical disk drive sharing the CD standard and the DVD standard.

The recording/reproducing signal processor 14 includes first and second reproducing processors 52 and 54 and first and second recording processors 36 and 38 which are connected to the optical pickup 12 and to a controller 16. The first recording processor 36 has a first modulation circuit 40, a first recording waveform generating circuit 42 and a first laser driving circuit 44 and is operated by the control of the controller 16. The first recording processor 36 drives the first light source 18 according to data to be recorded on the CD-R, that is, CD recording data according to the second standard, and drives the second light source 20 when reproducing data from the CD-R. The first modulation circuit 40 modulates the CD recording data to a signal of a format to be suitably recorded on the optical disk of the CD series. The first recording waveform generating circuit 42 generates, when recording data on the optical disk 10 by driving the first light source 18, a recording waveform signal corresponding to the signal modulated by the first modulation circuit 40. The first recording waveform generating circuit 42 also generates, when reproducing data from the optical disk 10 by driving the second light source 20, a preset reproducing waveform signal. The first laser driving circuit 44 drives the first light source 18 according to the recording waveform signal provided from the first recording waveform generating circuit 42 and drives the second light source 20 according to the preset reproducing waveform signal.

The second recording processor 38 has a second modulation circuit 46, a second recording waveform generating circuit 48 and a second laser driving circuit 50 and is operated by the control of the controller 16. The second recording processor 38 drives the first light source 18 according to data to be recorded on the DVD, that is, DVD recording data according to the first standard, and drives the first light source 18 even when reproducing data from the DVD. The second modulation circuit 46 modulates the DVD recording data to a signal of a format to be suitably recorded on the optical disk of the DVD series. The second recording waveform generating circuit 48 generates, when recording data on the optical disk 10 by driving the first light source 18, a recording waveform signal corresponding to the signal modulated by the second modulation circuit 46. The second recording waveform generating circuit 48 also generates, when reproducing data from the optical disk 10 by driving the first light source 18, a preset reproducing waveform signal.

The second laser driving circuit 50 drives the first light source 18 according to the recording waveform signal or the preset reproducing waveform signal provided from the second recording waveform generating circuit 48.

The first reproducing processor 52 has a first amplifying circuit 56 and a first demodulation circuit 58. If the optical disk 10 is of the CD series, the first reproducing processor 52 is operated by the control of the controller 16. The first reproducing processor 52 reproduces data from the electric signal generated from the optical detector 24 according to the second standard. The first amplifying circuit 56 amplifies the electric signal generated from the optical detector 24. The first demodulation circuit 58 demodulates the signal amplified by the first amplifying circuit 56 to generate CD reproducing data.

The second reproducing processor 54 has a second amplifying circuit 60 and a second demodulation circuit 62. If the optical disk 10 is an optical disk of the DVD series, the second reproducing processor 54 is operated by the control of the controller 16. The second reproducing processor 54 reproduces data from the electric signal generated from the optical detector 24 according to the first standard. The second amplifying circuit 60 amplifies the electric signal generated from the optical detector 24. The second demodulation circuit 62 demodulates the signal amplified by the second amplifying circuit 60 to generate DVD reproducing data.

The controller 16 uses a system controller so as to control the recording/reproducing apparatus shown in FIG. 3. The controller 16 controls the operation of the first and second recording processors 36 and 38 and the first and second reproducing processors 52 and 54 according to the kind of the optical disk 10 and an operating mode, that is, a recording mode, a reproducing mode or an erasing mode.

In the recording and reproducing apparatus of FIG. 3, an operation for reproducing data recorded on the CD-R is substantially identical to an operation for reproducing data from the CD-R in a general CD-R drive. An operation for recording and reproducing data on and from the DVD-RW is substantially identical to an operation for recording and reproducing data on and from the DVD-RW in a typical DVD drive. However, when recording data by increasing the rotating speed in order to shorten the recording time for the optical disk such as the CD-R having the wavelength characteristic, data is recorded by the light beam having the wavelength of 650 nm instead of the wavelength of 780 nm. In such a case, since the optical absorption rate when the light of the wavelength of 650 nm is used is higher than the optical absorption rate when the light of the wavelength of 780 nm is used by 5 times or more, data can be recorded with a low output. For example, the recording optical power is 15 mW when the light of the wavelength of 780 nm is used, whereas the recording optical power of 3 mW is sufficient to record data when the light of the wavelength of 650 nm is used. Generally, since the DVD-RW has the recording optical power of about 15 mW, a drive for recording data on this optical disk is designed to generate the recording optical power of 15 mW by the output of the light source of the wavelength of 650 nm. That is, the DVD drive having the semiconductor laser of 650 nm which can generate the recording optical power of 15 mW can sufficiently record data on the CD-R at high speed. Since the recording speed can be improved by speeding up the linear velocity of the optical disk, a problem such as the generating of heat or a rise in cost can be prevented. When reproducing data recorded on the optical disk such as the CD-R, the data is reproduced by the light beam having the wavelength of 780 nm, like a general case. In this instance, the size of the pits formed in the optical disk is controlled irrespective of the wavelength of the laser beam. Thus, the size of the pits which are formed in the CD-R by the light beam having the wavelength of 650 nm is a size which is readable by the light beam having the wavelength of 780 nm.

If the optical disk 10 is mounted in the drive having the recording/reproducing apparatus of FIG. 3, the controller 16 confirms the kind of the optical disk 10 and performs an operation suitable for the kind of the optical disk 10. To confirm the kind of the optical disk 10 is known to the art and therefore will not be described.

Figure 4:
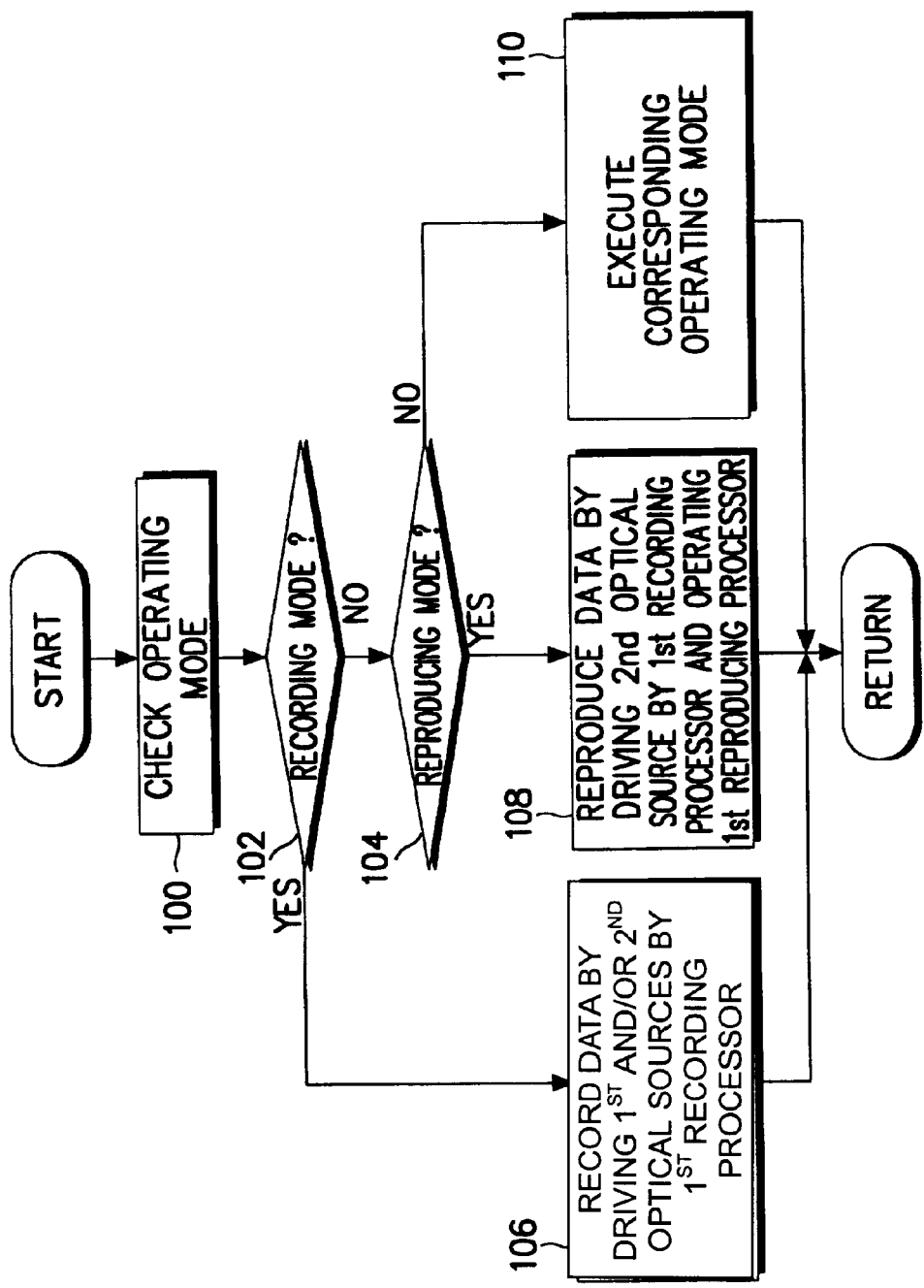
FIG. 4 is a flow chart showing a processing procedure of a controller illustrated in FIG. 3 when an optical disk is a CD-R according to the embodiment of the present invention.

FIG. 4 is a flow chart showing a processing procedure of the controller 16 shown in FIG. 3 when the optical disk 10 is the CD-R. If the optical disk 10 is mounted and the kind of the optical disk 10 is the CD-R, the controller 16 checks a current operating mode at step 100. At steps 102 and 104, it is checked whether the operating mode is a recording mode, a reproducing mode or other modes.

If the operating mode is set to the recording mode in step 102, the controller 16 records, at step 106, the CD recording data on the optical disk 10 by driving the first light source 18 by the first recording processor 36. In this case, the controller 16 does not drive the second light source 20 and does not operate the second recording processor 38 and the first and second reproducing processors 52 and 54. Therefore, the CD recording data is recorded on the CD-R by the laser of the wavelength of 650 nm of the first light source 18, and thus enabling the recording speed to be increased. If the operating mode is set to the reproducing mode in step 104, the controller 16 drives, at step 108, the second light source by the first recording processor 36 and operates the first reproducing processor 52, thereby generating the CD reproducing data from the optical disk 10. This is the same technique as a general CD-R reproducing technique. If the operating mode is set to other modes except the recording and reproducing mode, the controller 16 executes a corresponding operating mode at step 110. If the above operation is ended, the controller 16 returns to a typical control routine.

In addition, if the optical disk 10 is the CD-R, when recording data using the light beam of the wavelength of 650 nm generated from the first light source 18, the light beam of the wavelength of 780 nm may be irradiated to the optical disk 10 together with the light beam of the wavelength of 650 nm by driving the second light source 20 by the first recording processor 36, to promote efficiency.

Figure 5:
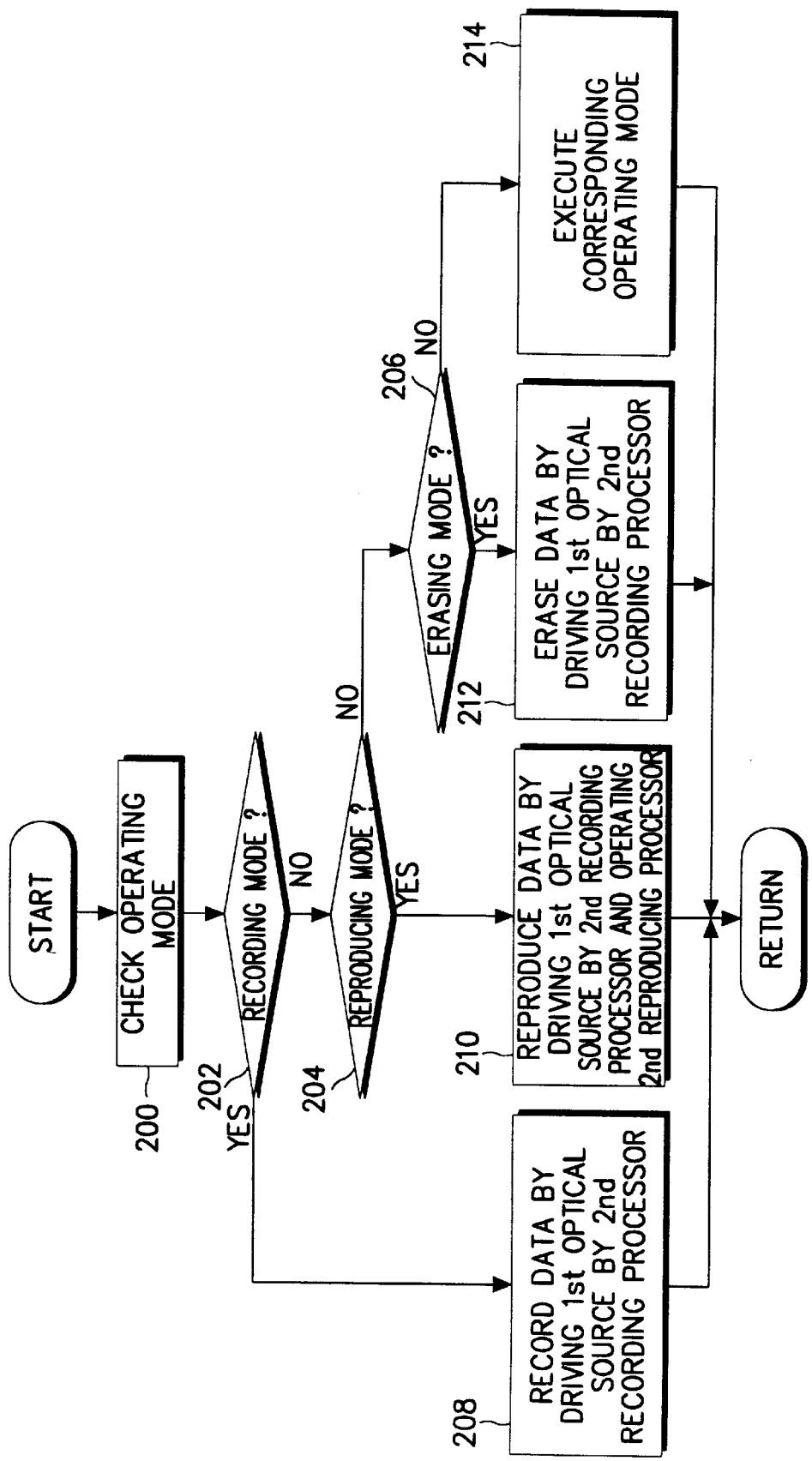
FIG. 5 is a flow chart showing a processing procedure of a controller illustrated in FIG. 3 when an optical disk is a DVD-RW according to the embodiment of the present invention.

FIG. 5 is a flow chart showing a processing procedure of the controller 16 shown in FIG. 3 when the optical disk 10 is the DVD-RW. If the optical disk 10 is mounted and the kind of the optical disk 10 is the DVD-RW, the controller 16 checks a current operating mode at step 200. At steps 202, 204 and 206, it is checked whether the operating mode is a recording mode, a reproducing mode, an erasing mode or other modes. Unlike the CD-R, the DVD-RW has the erasing mode since it is possible to erase data.

If the operating mode is set to the recording mode in step 202, the controller 16 records, at step 208, the DVD recording data on the optical disk 10 by driving the first light source 18 by the second recording processor 38. In this case, the controller 16 does not drive the second light source 20 and does not operate the first recording processor 36 and the first and second reproducing processors 52 and 54. If the operating mode is set to the reproducing mode in step 204, the controller 16 drives, at step 210, the first light source 18 by the second recording processor 38 and operates the second reproducing processor 54, thereby generating the DVD reproducing data from the optical disk 10. If the operating mode is set to the erasing mode in step 206, the controller 16 erases, at step 212, data recorded on the optical disk 10 by driving the first light source 18 by the second recording processor 38. If the operating mode is set to other modes except the recording, reproducing and erasing modes, the controller 16 executes a corresponding operating mode at step 214. If the above operation is ended, the controller 16 returns to a typical control routine. The operation of FIG. 5 is identical to a technique for recording, reproducing or erasing data in the general DVD-RW optical system.

Hence, the recording speed for the optical disk having the wavelength characteristic can be efficiently improved without generating heat. Meanwhile, it is essential to use the light source of the wavelength of 780 nm in order to reproduce data from the CD-R in the DVD system using the wavelength of 650 nm. When reproducing data from the CD-R in a 2wavelengths system, the wavelength of 780 nm is used. When recording data on the CD-R, the wavelength of 650 nm is used. Therefore, it is possible to record data on the CD-R at high speed. In the drive sharing technique described above, with regard to the CD-R and the rewritable optical disk of the DVD series, the present invention may be effectively used.

If the optical disk 10 is the CD-R, the absorption rate is high when recording data by the light beam of the wavelength of 650 nm. Therefore, the optical quantity reflected from the optical disk 10 is smaller than the optical quantity when the wavelength of 780 nm is used. The smaller quantity of the reflected light is undesirable for servo control when considering the fact that the servo control for the optical pickup 12 uses the light reflected from the optical disk. If the optical disk 10 is the CD-R, as noted above, when recording data using the light beam of the wavelength of 650 nm generated from the first light source 18, the light beam of the wavelength of 780 nm may be irradiated to the optical disk 10 together with the light beam of the wavelength of 650 nm by driving the second light source 20 by the first recording processor 36, to promote efficiency. Then the quantity of the reflected light increases and the servo control for the optical pickup is effectively performed. Even if the optical disk 10 is the DVD-RW, the same principle is applicable during recording.

As noted above, the recording speed for the optical disk having the wavelength characteristic can be efficiently improved without any problem of the generation of heat or a rise in cost. Further, the present invention may be more effectively used in the drive sharing of the CD-R and the rewritable optical disk of the DVD series (DVD-RW).

While the invention has been shown and described with reference to a certain preferred embodiment thereof, it will be understood by those skilled in the art that various changes in form and details may be made therein. Especially, although the present invention has been applied to the drive using the CD-R and the rewritable optical disk of the DVD series, it may be identically applied to the drive for recording and reproducing optical disks having the wavelength characteristic like the CD-R. If the drive uses a new DVD standard utilizing the light of a wavelength shorter than 600 nm, the same principle is applicable. In such a case, one light source is used to oscillate a wavelength shorter than 600 nm, that is, a a blue or green laser. Another light source is used to oscillate a wavelength of 780 nm or between 635 nm and 650 nm, that is, an infrared or red laser. Therefore, it is intended that the present invention is not limited to the particular embodiment disclosed as the best mode contemplated for carrying out the present invention, but that the present invention includes all embodiments falling within the scope of the appended claims.

What is claimed is:

1. A method of recording and reproducing data on and from optical disks, comprising:

irradiating a first light beam of a first wavelength together with a second light beam of a second wavelength different from the first wavelength on a track of a layer of one of the optical disks of a first standard to record the data on the one optical disk; and irradiating the second light beam on the one optical disk to reproduce the data from the one optical disk, wherein the first light beam is used to reproduce data from another one of the optical disks having a second standard different from the first standard.

2. The method as claimed in claim 1, wherein said first wavelength is shorter than said second wavelength.

3. A method as claimed in claim 1, wherein the one optical disk has a first absorption rate for the first light beam of the first wavelength and a second absorption rate lower than the first absorption rate for the second light beam of the second wavelength.

4. The method as claimed in claim 3, wherein said first wavelength is shorter than said second wavelength.

5. The method as claimed in claim 4, wherein said first light beam is red laser beam and said second light beam is an infrared laser beam.

6. The method as claimed in claim 4, wherein the first light beam is of the first standard which is a digital video disk standard and the second light beam is of the second standard which is a compact disk standard.

7. The method as claimed in claim 4, wherein said first light beam is a blue or green laser beam and said second light beam is a red or infrared laser.

8. The method as claimed in claim 1, wherein the one optical disk is a recordable compact disk.

9. The method as claimed in claim 1, wherein the first light beam of the first wavelength is suitable to record data on the another optical disk.

10. The method as claimed in claim 9, wherein the one optical disk is a recordable compact disk and the another optical disk is a rewritable digital video disk.

11. A method of recording and reproducing data by irradiating lights beams to at least one of a first optical disk of a first kind exhibiting a difference in an optical absorption rate between wavelengths and a second optical disk of a second kind, the method comprising:

recording said data on a track of a layer of said first optical disk using a first one of the light beams having a first wavelength of a first standard of a first absorption rate together with a second one of the light beams having a second wavelength of a second standard of a second absorption rate lower than the first absorption rate in said first optical disk, and reproducing said data recorded on said first optical disk using the second one of the light beams; and recording said data on said second optical disk using said first light beam having the first wavelength of said first standard, and reproducing said data recorded on said second optical disk using said first light beam having the first wavelength of said first standard.

12. The method as claimed in claim 11, wherein said first wavelength of said first standard is shorter than said second wavelength of said second standard.

13. The method as claimed in claim 12, wherein said first light beam of said first standard is a red laser said second and light beam of said second standard is an infrared laser.

14. The method as claimed in claim 12, wherein said first standard is a digital video disk standard and said second standard is a compact disk standard.

15. The method as claimed in claim 12, wherein said first light beam of said first standard is a blue or green laser and said second light beam of said second standard is a red or infrared laser.

16. The method as claimed in claim 12, further comprising erasing said data recorded on said second optical disk using said first light beam of said first standard.

17. A method of recording data on an optical disk, comprising:

irradiating a first light beam of a first standard on the optical disk together with a second light beam of a second standard different from the first standard to record the data on a track of a layer of the optical disk; and irradiating the second light beam to reproduce the data from the optical disk, wherein the first standard is used to reproduce the data from a first type of optical disk having a first thickness and the second standard is used to reproduce the data from a second type of optical disk used to reproduce the data from a second type of optical disk having a second thickness different from the first thickness.

18. A method of recording data on an optical disk having different optical absorption rates at different wavelengths of incident light beams, comprising:

simultaneously irradiating first and second light beams of respective different wavelengths on a track of a layer of the optical disk to record the data on the optical disk; and irradiating one of the first and second light beams on the optical disk to reproduce the data from the optical disk, wherein the other one of the first and second light beams has a wavelength to reproduce data from another optical disk having a standard different than a standard of the optical disk.

19. An apparatus for use with an optical disk having different optical absorption rates at different wavelengths of incident light, the apparatus comprising:

a first light source to generate a first light beam of a first wavelength corresponding to reproducing data from a first optical disk having a first optical reflectance characteristic as a function of wavelength;

a second light source to generate a second light beam of a second wavelength corresponding to reproducing data from a second optical disk having a second optical reflectance characteristic as a function of wavelength different than the first optical reflectance characteristic; and a controller to simultaneously cause said first light source to irradiate the first light beam and said second light source to irradiate the second light beam on a track of a layer of the first optical disk to non-magnetically record the data on the first optical disk using the first and second light beams.

20. A method of recording data on an optical disk of a first standard, comprising:

receiving recording data to be recorded on a first optical disk of the first standard; and irradiating a second light beam having a wavelength of a second standard different from the first standard on the first optical disk based on the received recording data together with a first light beam having a wavelength of the first standard to non-magnetically record the data on a track of a layer of the first optical disk, wherein the first and second standards are to reproduce data from the first optical disk and a second optical disk of the second standard.

21. The method as claimed in claim 20, wherein the first optical disk is a compact disk and the wavelength of the second standard is 635–650 nm.

22. A method of recording data on optical disks, comprising:

receiving one of the optical disks; and irradiating light beams of different wavelengths together on a track of a recording layer of the received optical disk to non-magnetically record the data on the received optical disk, wherein first and second ones of the irradiated light beams have reproducing wavelengths to reproduce data from corresponding first and second ones of the optical disks, where the first optical disk is compliant with a first standard and the second optical disk is compliant with a second standard different than the first standard.

23. The method of claim 22, wherein one of the light beams comprises a reproducing wavelength used to reproduce data from the received optical disk.

24. The method of claim 23, wherein another one of the light beams comprises a recording wavelength used to record data on a different one of the optical disks.

25. The method of claim 24, wherein the received optical disk has an absorption rate for the light beam of the reproducing wavelength that is different from absorption rate for the light beam of the recording wavelength.

26. The method of claim 24, wherein the reproducing wavelength is shorter than the recording wavelength.

27. The method of claim 23, wherein another one of the light beams comprises a reproducing wavelength used to reproduce data on a different one of the optical disks.

28. An apparatus for recording data on optical disks, the apparatus comprising:

light sources to generate light beams of different wavelengths, at least two of the wavelengths being reproducing wavelengths for corresponding optical disks having different reproducing standards; and a controller to activate said light sources to irradiate the light beams together on a recording layer of a received optical disk to non-magnetically record data on a track of the recording layer.

29. A computer readable medium encoded with processing instructions for performing a method of recording data on optical disks using a computer, the method comprising:

receiving one of the optical disks; and irradiating light beams of different wavelengths together on a recording layer of the received optical disk to non-magnetically record the data on a track of the received optical disk, wherein first and second ones of the light beams have reproducing wavelengths to reproduce data from corresponding first and second ones of the optical disks having different reproducing standards.

30. The computer readable medium of claim 29, wherein one of the light beams comprises a reproducing wavelength used to reproduce data from the received optical disk.

31. The computer readable medium of claim 30, wherein another one of the light beams comprises a recording wavelength used to record data on the different one of the optical disks.

32. The computer readable medium of claim 30, wherein one of the light beams comprises a reproducing wavelength used to reproduce data from the different one of the optical disks.

33. The computer readable medium of claim 31, wherein the received optical disk has an absorption rate for the light beam of the reproducing wavelength that is different from absorption rate for the light beam of the recording wavelength.

34. The computer readable medium of claim 33, wherein the reproducing wavelength is shorter than the recording wavelength.

* * * * *